United States Patent
Lang

(10) Patent No.: US 9,796,537 B2
(45) Date of Patent: Oct. 24, 2017

(54) PACKAGING ASSEMBLY

(71) Applicant: Multivac Sepp Haggenmüller GmbH & Co. KG, Wolfertschwenden (DE)

(72) Inventor: Michael Lang, Buching (DE)

(73) Assignee: MULTIVAC SEPP HAGGENMUELLER GMBH & CO. KG, Wolfertschwenden (DE)

(*) Notice: Subject to any disclaimer, the term of this patent is extended or adjusted under 35 U.S.C. 154(b) by 0 days.

(21) Appl. No.: 14/973,557

(22) Filed: Dec. 17, 2015

(65) Prior Publication Data
US 2016/0176656 A1   Jun. 23, 2016

(30) Foreign Application Priority Data

Dec. 22, 2014   (EP) .................................. 14199600

(51) Int. Cl.
| | |
|---|---|
| B65G 47/32 | (2006.01) |
| B65B 47/00 | (2006.01) |
| B65B 51/00 | (2006.01) |
| B65B 57/00 | (2006.01) |
| B65G 47/68 | (2006.01) |
| B65B 9/04 | (2006.01) |
| B65G 47/91 | (2006.01) |

(52) U.S. Cl.
CPC ................ B65G 47/32 (2013.01); B65B 9/04 (2013.01); B65B 47/00 (2013.01); B65B 51/00 (2013.01); B65B 57/00 (2013.01); B65G 47/682 (2013.01); B65G 47/918 (2013.01); B65G 2203/0258 (2013.01); Y10S 198/959 (2013.01)

(58) Field of Classification Search
CPC .... B65G 47/32; B65G 47/682; B65G 47/907; B65G 47/918; B65G 2203/0258; B65B 9/04; B65B 47/00; B65B 51/00; B65B 57/00; Y10S 198/959
See application file for complete search history.

(56) References Cited

U.S. PATENT DOCUMENTS

| | | | | |
|---|---|---|---|---|
| 3,485,339 A | * | 12/1969 | Miller | ............... B65G 43/08 198/460.1 |
| 3,934,920 A | * | 1/1976 | Rowekamp | ............. B65B 21/20 294/65 |
| 5,273,152 A | * | 12/1993 | Brun | .................. B29C 49/4215 198/468.3 |
| 5,304,745 A | * | 4/1994 | Rusk | ...................... B07C 5/16 177/128 |

(Continued)

FOREIGN PATENT DOCUMENTS

| | | |
|---|---|---|
| EP | 2557043 A1 | 2/2013 |
| EP | 2733095 A1 | 5/2014 |

*Primary Examiner* — Gerald McClain
*Assistant Examiner* — Keith R Campbell
(74) *Attorney, Agent, or Firm* — Husch Blackwell LLP

(57) ABSTRACT

A packaging assembly and a method of operating such a packaging assembly, the packaging assembly comprises at least one of a thermoform packaging machine, a separation robot, a conveyor and a checkweigher. The separation robot is operable to adjust a distance between packages of a group of packages formed by the packaging machine. The conveyor and the separation robot may be operated together to provide a flow of packages that is supplied to the checkweigher, wherein the flow of packages may include substantially constant distances between the individual packages.

14 Claims, 3 Drawing Sheets

(56) References Cited

U.S. PATENT DOCUMENTS 7,690,706 B2 * 4/2010 Wild ................... B65G 47/907
                                                198/468.3
8,594,833 B2 * 11/2013 Goodman ............ B65G 47/918
                                                198/468.3

* cited by examiner

PACKAGING ASSEMBLY

CROSS-REFERENCE TO RELATED APPLICATIONS

This Application claims priority to European Patent Application Number 14199600.9 filed Dec. 22, 2014, to Michael Lang, currently pending, the entire disclosure of which is incorporated herein by reference.

FIELD OF THE INVENTION

The present invention relates to a packaging assembly and to a method of operating such a packaging assembly.

BACKGROUND OF THE INVENTION

EP 2 733 095 A1 discloses a packaging assembly and a thermoform packaging machine that provides a format of packages in the form of a plurality of lanes and rows to a transfer device configured for taking up a respective lane of packages from the thermoform packaging machine and putting the packages down on a conveyor. Making use of two acceleration belts, the packages are spaced from one another in the conveying direction along the conveyor, so that, subsequently, the packages can be supplied to an inspection module individually and can be conveyed therethrough.

EP 2 557 043 A1 discloses a suction gripper assembly that takes up a plurality of packages and reduces the distances between the individual packages during a transfer phase such that the respective rims of two neighboring packages overlap so as to minimize the space requirements in a final package.

SUMMARY OF THE INVENTION

One object of the present invention is to improve a packaging assembly such that it allows an improved generation of constant package-to-package spacings between the packaging machine and an inspection module, for example, a checkweigher.

The packaging assembly according to one embodiment of the present invention comprises a thermoform packaging machine, a separation robot for transferring packages, a conveyor and a checkweigher, for example, a dynamic control weigher. The separation robot may comprise a gripper with a plurality of product take-up devices that are displaceable relative to one another. The gripper may be displaceable between a first position, at which neighboring product take-up devices are spaced apart at a first distance and at which the gripper is adapted to take up a respective package at each product take-up device, and a second position, at which the neighboring product take-up devices are spaced apart at a second, larger distance and at which the gripper is adapted to put down onto the conveyor the packages that have been taken up, wherein the second distance is at least one and a half times the size of the first distance. This allows spacing apart all the packages on the conveyor and a largely constant flow of packages on a weighing belt of the checkweigher with minimum deviations, so that the conveying speed can be kept low and/or the length of the weighing belt can be kept short.

In one embodiment, the second distance is at least twice the size of the first distance, so that minor deviations with respect to the individual distances between successive packages can more easily be compensated.

According to one embodiment, the separation robot is configured for synchronizing the gripper and the product take-up devices, respectively, to a conveying speed of the conveyor. Thus, it is possible to accomplish a higher precision of the deposition position of the packages on the conveyor.

The conveying speed of the conveyor may be between 20 m/min and 40 m/min.

The mutual distances between the product take-up devices of the gripper may be adjustable by means of a horizontal translational movement. This allows a structurally simple design for a change of distance during the transfer movement.

A method according to one embodiment of the present invention used for operating a packaging assembly, which comprises a thermoform packaging machine, a conveyor, a separation robot and a checkweigher, may be characterized in that, during each transfer movement, the separation robot transfers a group of packages from the thermoform packaging machine to the conveyor and, in so doing, enlarges, prior to putting the packages down onto the conveyor, the first distance between the taken-up packages to a second distance between the respective packages, which may be at least one and a half times the size of the first distance.

According to one embodiment, the first distance between two packages within the group on a discharge belt of the thermoform packaging machine is enlarged, during a transfer movement, to a distance that is at least twice as large or more than twice as large by means of the separation robot, so that minor deviations with respect to the individual distances between successive packages can more easily be compensated.

The separating robot can be used for putting down a second group of packages onto the conveyor after a first group of packages such that a third distance between a last package of a first group and a first package of a second, directly following group on the conveyor corresponds approximately to the second distance between the packages within the groups. An approximately constant flow of packages with distances between successive packages which are constant to the greatest possible extent can thus easily be realized already on the conveyor. This distance may already be the distance that is intended to be used for the checkweigher.

According to one embodiment, the packaging assembly comprises an acceleration belt between the conveyor and the checkweigher and, by means of the acceleration belt, the third distance between the packages is enlarged by further 25% or more than 25%.

Other and further objects of the invention, together with the features of novelty appurtenant thereto, will appear in the course of the following description.

DESCRIPTION OF THE SEVERAL VIEWS OF THE DRAWING

In the following, an advantageous embodiment of the present invention will be explained in more detail making reference to a drawing, in which the individual figures show.

Like components are provided with like reference numerals throughout the figures.

DETAILED DESCRIPTION OF THE INVENTION

Figure 1:
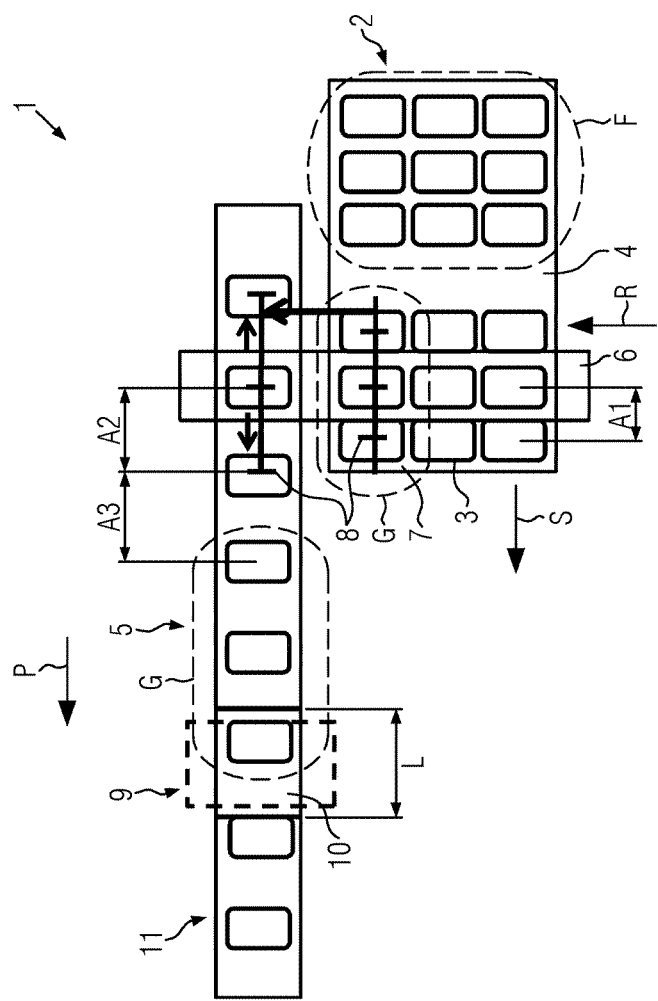
FIG. 1 is a schematic top view of a packaging assembly according to one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a packaging assembly 1 according to one embodiment of the present invention in a schematic top view with a representation of part of an intermittently operated thermoform packaging machine 2, which provides formats F of nine packages 3 at its end on a discharge belt 4. The format F may comprise three lanes S and three rows R, wherein each of the lanes S and rows R include three packages 3, and wherein the lanes S are longitudinally oriented in a production direction P and the rows R are transversely oriented relative to the production direction P. For transferring the packages 3 from the discharge belt 4 of the thermoform packaging machine 2 lane by lane to a conveyor 5, a separation robot 6 may be provided, which comprises a gripper 7 with three product take-up devices 8. The gripper 7 can be configured such that it is capable of moving apart the outer two product take-up devices 8 relative to the central product take-up device 8 along the production direction P so as to move the packages 3, which have been taken up by means of a vacuum suction effect, apart in the production direction P during a transfer movement taking place transversely to the production direction P for obtaining a desired distance A between two packages 3 following one another in the production direction P.

FIG. 1 shows the gripper 7 at two different positions. At the first position, the gripper 7 is located above three packages 3 provided by the packaging machine 2 on a common lane S. Neighboring product take-up devices 8 of the three product take-up devices 8 of the gripper 7 are here spaced apart at a first distance A1. This first distance A1 may be generally identical to the distance at which two neighboring packages 3 are produced and provided by the packaging machine 2.

FIG. 1 additionally shows the gripper 7 at a second position that can be reached by the gripper 7 when it is positioned above the conveyor 5. At this second position, two neighboring product take-up devices 8 are spaced apart at a second, larger distance A2. Whereas, when occupying the first position, the gripper 7 takes up packages 3, for example, in that a vacuum is applied to the product take-up devices 8 configured as vacuum, suction units. The gripper 7, when occupying the second position, may be configured for putting the packages 3, which have been taken up, down onto the conveyor 5. This may be done, for example, by switching off the vacuum applied to the product take-up devices 8 configured as suction grippers.

The gripper 7 can move from the first position to the second position while carrying out simultaneously the transfer movement indicated by an arrow perpendicular to the production direction P. However, it would also be imaginable that the movement from the first position to the second position of the gripper 7 does not take place simultaneously with the transfer movement, but, at least partially, before the beginning or after the end of the transfer movement.

A checkweigher 9, (e.g., a dynamic control weigher or belt weigher), can be provided downstream of the conveyor 5 in the production direction P. The checkweigher 9 may include a weighing belt 10 for weighing a respective individual package 3 during the conveying movement. The conveying speed of the weighing belt 10 may be generally synchronous with the conveying speed of the conveyor 5 preceding the weighing belt 10 in an upstream direction. The weighing belt 10 can transfer the package 3 to a downstream conveyor belt 11.

In the following, the mode of operation will be explained in more detail. The checkweigher 9 needs a measurement time of 60 to 120 ms, for example. During this measurement time, the individual package 3 must be present on the weighing belt 10. From the minimum measurement time required, a dependence results between the length L of the weighing belt 10 and the conveying speed with which the package 3 is conveyed over the weighing belt 10. An optimum can be achieved, when the packages 3 are conveyed uniformly, continuously and at equal distances from one another, so as to accomplish a specific overall performance. When the packages 3 are being conveyed in an non-uniform manner, it may be necessary to provide, for the same overall performance, a greater length of the weighing belt 10 and, in addition, a higher conveying speed, so to be able to compensate and process the irregularities of the different distances between successive packages 3 on the conveyor 5.

For producing a continuous flow of approximately equally spaced packages 3 on the conveyor 5, the following sequence of steps may be provided. The packages 3 of a group G corresponding to the number of packages 3 of a lane S in format F can be spaced apart at a first distance A1 on the discharge belt 4 of the thermoform packaging machine 2 may be taken up by the gripper 7 of the separation robot 6. The product take-up devices 8, which have each centrally taken up a single package 3, maybe adjustable by means of a mechanical system, which is not shown in detail, such that the two outer product take-up devices 8 may be moved in a horizontal translational movement outwards (by, for example, 100 mm), i.e., away from the central product take-up device 8, while the gripper 7 is moving in the direction of the conveyor 5. Before the packages 3 are put down on the conveyor 5, they are spaced apart at a new second distance A2 corresponding to the first distance A1 plus a certain amount (e.g., 100 mm). Within the framework of the present invention, the "distance" is defined as the center-to-center distance of two neighboring packages 3 of a common group P or as the mutual distance between the front edges defining the leading edges of two neighboring packages when seen in the production direction P.

The gripper 7 may put the packages 3 down onto the continuously running conveyor 5 such that, after the deposition process, the first package 3 of this group G is spaced apart at a third distance A3 from the last package 3 of the group G preceding in a downstream direction. The distance A3 may correspond approximately to the distance A2 so that all the packages 3 positioned on the conveyor 5 are, at least approximately, equally spaced apart at distances A2 and A3 from the respective neighboring packages 3. The term "approximately" used in this context means that the distances A2 and A3 differ from one another by less than about 20 mm in one embodiment, or less than about 10 mm in another embodiment.

Figure 2:
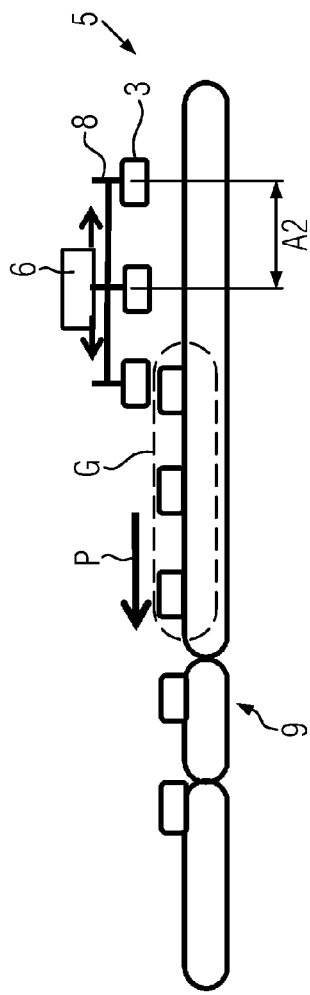
FIG. 2 is a schematic side view of a conveyor according to one embodiment of the present invention illustrating the conveyor in a first phase.

FIG. 2 shows a schematic side view of the conveyor 5 and of the separation robot 6 in a first phase. In the first phase, the packages 3 have been taken up by the gripper 7 by means of the product take-up devices 8 having, on their lower side, vacuum suction units, which are not shown in detail, and raised relative to the discharge belt 4 of the thermoform packaging machine 2. The discharge belt 4 is no longer shown in FIG. 2. The outer product take-up devices 8 have here been moved away from the central product take-up device 8, for example, by 100 mm in the direction of the arrow, so that the packages 3 are spaced apart at a second distance A2 from one another. The group G of three packages 3, which is already present on the conveyor 5 can then be conveyed at the conveying speed of the conveyor 5 in the production direction P so as to supply it to the checkweigher 9.

Figure 3:
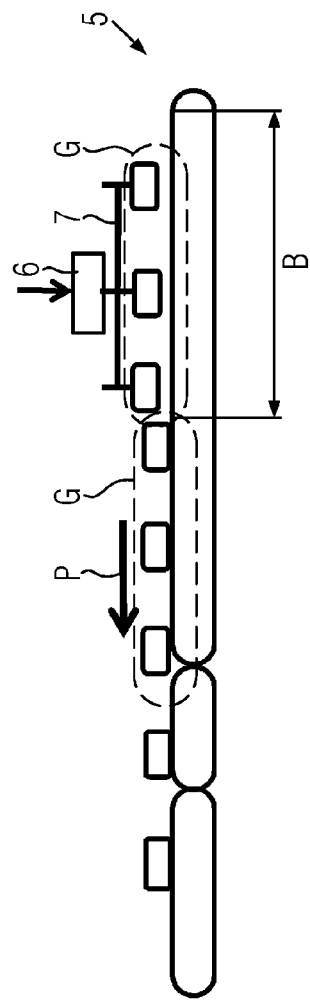
FIG. 3 is a schematic side view of the conveyor of FIG. 2 in a second phase.

FIG. 3 shows the second phase, in which the group G, which is present on the conveyor 5, has been moved away from a deposition area B so that the gripper 7 will be able to bring the next group G in position for the purpose of deposition.

Figure 4:
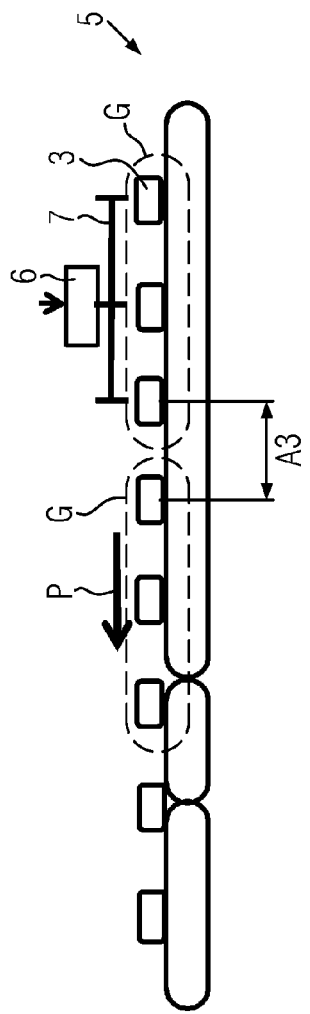
FIG. 4 is a schematic side view of the conveyor of FIG. 2 in a third phase.

FIG. 4 shows the third phase, in which the gripper 7 puts down the group G (i.e., the three packages 3) immediately at the moment at which the distance A3 between the last package 3 of the preceding group G and the first package 3 of the group G that is to be put down at the moment in question corresponds to the distance A2 within a group G. During the subsequent return movement of the gripper 7 from the conveyor 5 back to the discharge belt 4 of the thermoform packaging machine 2, the outer two product take-up devices 8 can move back inwards to the initial first distance A1 for taking up and transferring the next group G or lane S of three packages 3 (see FIG. 1). According to a variant that is not shown in detail, the separation robot 6 includes a unit that enables the separation robot 6 to move the gripper 7 in the production direction P so as to synchronize, for the purpose of putting down the packages, the product take-up devices 8, at least temporally, to the conveying speed of the conveyor in order to allow a precise positioning of the packages 3.

Figure 5:
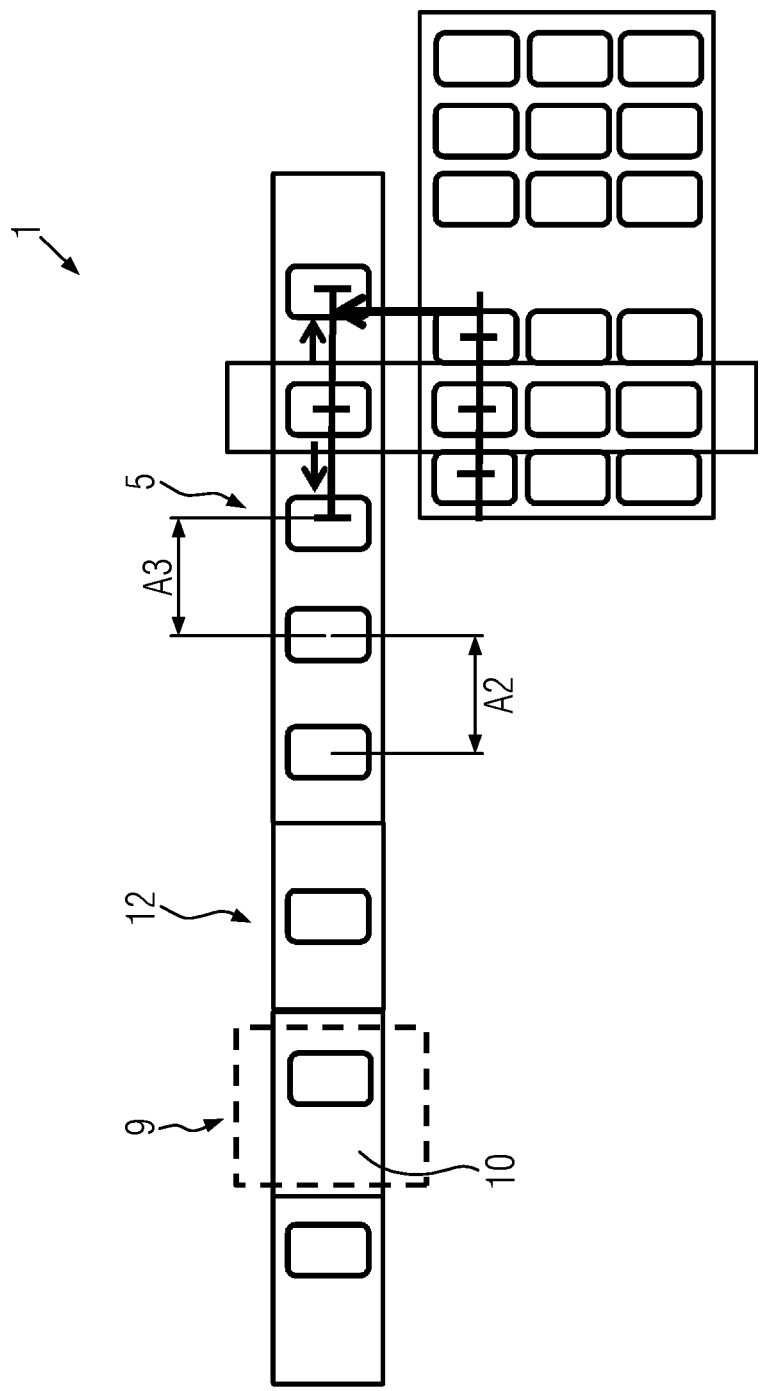
FIG. 5 is a schematic top view of a packaging assembly including an acceleration belt according to one embodiment of the present invention.

FIG. 5 shows a schematic top view of a variant of the packaging assembly 1 comprising an acceleration belt 12 provided between the conveyor 5 and the checkweigher 9, so as to enlarge the third distance A3 and the second distance A2 by operating the acceleration belt 12 at a conveying speed that exceeds the conveying speed of the conveyor 5, for example, by 20%. According to this embodiment of the packaging assembly 1, the weighing belt 10 may be longer than the weighing belt 10 according to FIG. 1.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A packaging assembly comprising:
    a packaging machine for producing a plurality of packages, wherein the packages travel through the packaging machine in a production direction, and the produced packages are spaced apart in the production direction at a production distance;
    a conveyor for conveying packages in a direction substantially parallel to the production direction; and
    a separation robot for transferring packages from the packaging machine to the conveyor, the separation robot including a gripper with a plurality of product take-up devices that are displaceable relative to one another, wherein the product take-up devices are displaceable between:
    a first position, at which neighboring product take-up devices of said plurality of product take-up devices are spaced apart at a first distance in the production direction and at said first distance, said plurality of product take-up devices of the gripper are adapted to take up a respective package from said packaging machine; and
    a second position, at which said neighboring product take-up devices of said plurality of product take-up devices are spaced apart at a second distance in the production direction and at which the gripper is disposed to put down the packages taken up by said plurality of product take-up devices onto the conveyor so that said packages are spaced apart on the conveyor in the production direction at a conveying distance;
    wherein the second distance is greater than the first distance.

2. The packaging assembly according to claim 1, wherein the packaging machine is a thermoform packaging machine.

3. The packaging assembly according to claim 1 further comprising a checkweigher disposed downstream of said conveyor.

4. The packaging assembly according to claim 1, wherein the second distance is at least twice the size of the first distance.

5. The packaging assembly according to claim 1, wherein the separation robot is configured for synchronizing a movement of the gripper to a conveying speed of the conveyor.

6. The packaging assembly according to claim 5, wherein the conveying speed of the conveyor is between about 20 m/min and about 40 m/min.

7. The packaging assembly according to claim 1, wherein distances between the neighboring product take-up devices of said plurality of product take-up devices of the gripper are adjustable by a mechanical system which effectuates a horizontal translational movement in a production direction between said neighboring product take-up devices.

8. A method of operating a packaging assembly, the method comprising the steps of:
   providing a packaging machine, a conveyor, and a separation robot;
   wherein the separation robot transfers a first group of packages from the packaging machine to the conveyor and, in so doing, enlarges, prior to putting the packages down onto the conveyor, a first distance between the packages to a second distance between the respective packages;
   wherein the second distance is at least one and a half times the size of the first distance;
   wherein, the separation robot puts down a second group of packages onto the conveyor after the first group of packages such that a third distance between a last package of the first group and a first package of the second group is approximately equal to the second distance between the packages within the first group.

9. The method according to claim 8, wherein the first distance between two packages within the group on a discharge belt of the packaging machine is enlarged, during a transfer movement, to the second distance that is at least twice as large as the first distance.

10. A method of operating a packaging assembly, the method comprising the steps of:
    providing a packaging machine, a conveyor, and a separation robot;
    transferring a first group of packages using the separation robot from the packaging machine to the conveyor, wherein said first group of packages comprises a plurality of packages;
    placing the first group of packages on the conveyor using the separation robot;
    enlarging a first distance between the packages of said first group to a second distance between the respective packages before said first group of packaging is placed on the conveyor, wherein the second distance is greater than the first distance; and
    placing a second group of packages on the conveyor after placing said a-first group of packages such that, when said second group directly follows said first group, a third distance between a last package of said a first group and a first package of said second group on the conveyor substantially corresponds to the second distance between the packages within the first group.

11. The method according to claim 10, further comprising additionally enlarging one of the second distance or the third distance using an acceleration belt, wherein the packaging assembly comprises the acceleration belt disposed between the conveyor and a checkweigher.

12. The method according to claim 11, wherein the third distance is additionally enlarged by at least twenty five (25) percent.

13. The method according to claim 8, wherein the packaging assembly comprises an acceleration belt disposed between the conveyor and a checkweigher, and wherein the acceleration belt operates at a speed such that one of the second distance or the third distance between the packages is enlarged by twenty five (25) percent as the packages are conveyed from the conveyor to the checkweigher.

14. The packaging assembly according to claim 1, wherein at least two of said plurality of product take-up devices of said gripper are disposed one-after-the-other on a line substantially parallel to the production direction.

\* \* \* \* \*

UNITED STATES PATENT AND TRADEMARK OFFICE
CERTIFICATE OF CORRECTION

PATENT NO. : 9,796,537 B2
APPLICATION NO. : 14/973557
DATED : October 24, 2017
INVENTOR(S) : Michael Lang Page 1 of 1

It is certified that error appears in the above-identified patent and that said Letters Patent is hereby corrected as shown below:

On the Title Page

Item (73) Assignee should read: MULTIVAC SEPP HAGGENMUELLER SE & CO. KG, Wolfertschwenden (DE)

Signed and Sealed this
Tenth Day of July, 2018

Andrei Iancu
*Director of the United States Patent and Trademark Office*